United States Patent
Schneider et al.

[11] Patent Number: 5,950,483
[45] Date of Patent: *Sep. 14, 1999

[54] PROCESS FOR FORMING A CASING COVER HAVING AN ANNULAR RECESS FOR A TORQUE CONVERTER

[75] Inventors: Ruthard Schneider, Königshofen; Herbert Schmid, Münnerstadt; Wolfgang Hauck, Gochsheim, all of Germany

[73] Assignee: Fichtel & Sachs AG, Schweinfurt, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/710,428

[22] Filed: Sep. 17, 1996

[30] Foreign Application Priority Data

Oct. 28, 1995 [DE] Germany ............ 195 40 294

[51] Int. Cl.⁶ .................................................. B21D 53/84
[52] U.S. Cl. ......................... 72/414; 72/379.2; 29/889.5
[58] Field of Search ............... 60/330, 347, 357, 60/358, 359, 362, 364, 365, 366, 367; 72/414, 352, 360, 335, 379.2; 29/889.5

[56] References Cited

U.S. PATENT DOCUMENTS

| | | |
|---|---|---|
| 3,090,252 | 5/1963 | Mamo . |
| 3,138,107 | 6/1964 | Zeidler . |
| 3,240,308 | 3/1966 | Frost ............................... 60/357 |
| 3,388,552 | 6/1968 | Bilton ............................. 60/359 |
| 3,808,809 | 5/1974 | Upton ............................. 60/347 |
| 3,965,680 | 6/1976 | Cottrell et al. ................. 60/357 |
| 4,825,521 | 5/1989 | Frotschner ...................... 29/889.5 |
| 5,384,958 | 1/1995 | O'Daniel ........................ 29/889.5 |
| 5,522,220 | 6/1996 | Locker . |
| 5,575,363 | 11/1996 | Dehrmann . |

FOREIGN PATENT DOCUMENTS

| | | |
|---|---|---|
| 81 263 | 7/1961 | France . |
| 41 17 151 A1 | 5/1991 | Germany . |
| 41 21 586 A1 | 6/1993 | Germany . |
| 43 20 288 A1 | 6/1993 | Germany . |
| 41020 | 4/1981 | Japan ................................ 72/414 |
| 142047 | 6/1987 | Japan ................................ 72/352 |
| 0 106 6666 | 1/1990 | Japan . |
| 2-245562 | 1/1990 | Japan . |
| 799340 | 8/1958 | United Kingdom ........... 29/889.5 |
| 2 285 114 | 6/1995 | United Kingdom . |

*Primary Examiner*—Daniel C. Crane
*Attorney, Agent, or Firm*—Cohen, Pontani, Lieberman & Pavane

[57] ABSTRACT

A hydrokinetic torque converter includes an impeller driven by an internal combustion engine, a turbine coupled to an output shaft, and a stator that can be blocked in one rotational direction, which together form a converter circuit filled with converter fluid, which is supplied from a supply container by a hydraulic supply system through supply lines and return lines, at least one of which is in flow connection with at least one opening, which is provided on a separating wall located between the turbine hub and the associated casing cover of the converter housing and connects that line to a chamber defined by the casing cover and an adjacent converter element. The separating wall is integrally constructed with the casing cover and preferably acts in the radial extension area of the turbine hub as an axial support for supporting the turbine hub against axial movements.

3 Claims, 2 Drawing Sheets

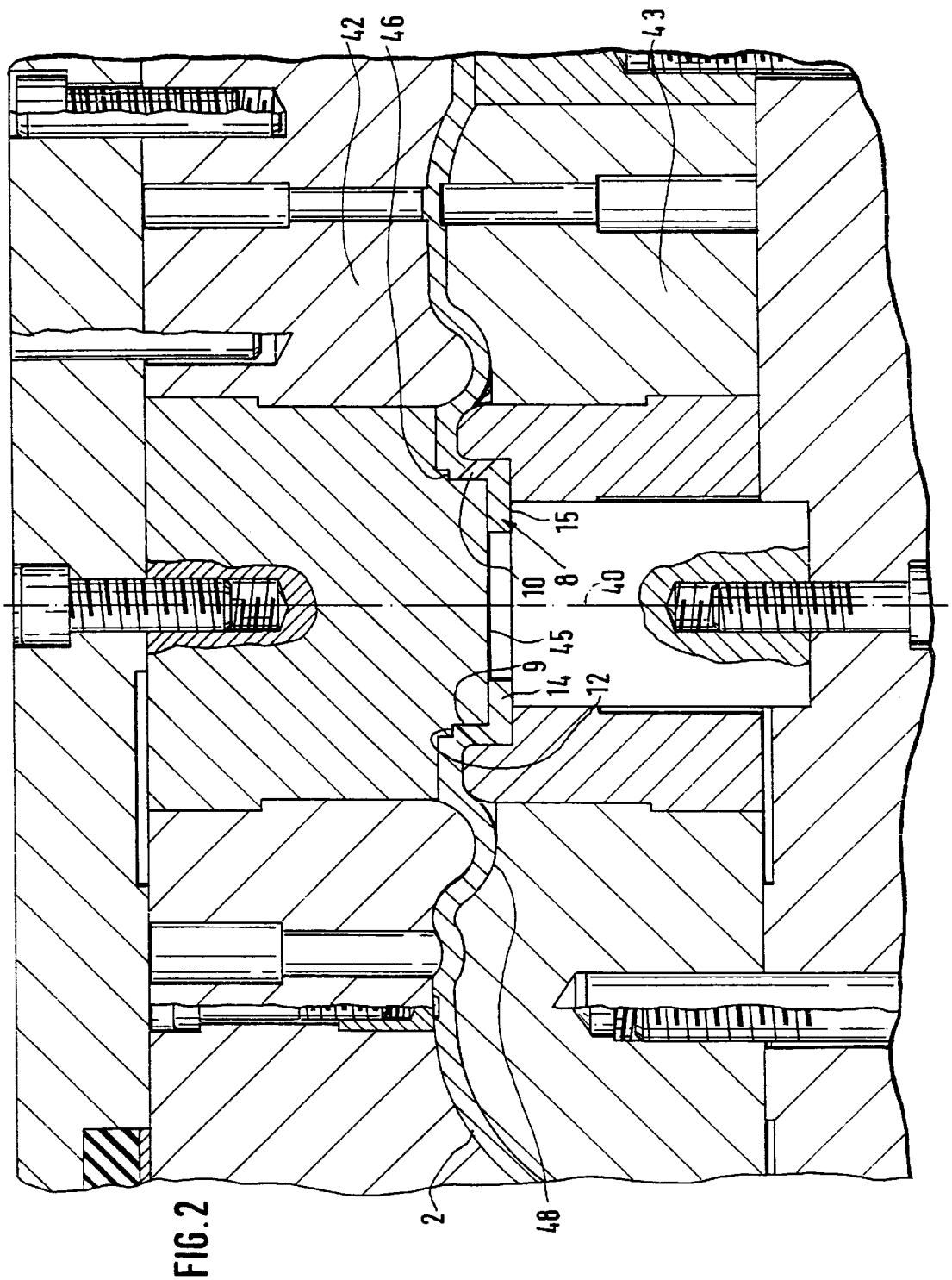

PROCESS FOR FORMING A CASING COVER HAVING AN ANNULAR RECESS FOR A TORQUE CONVERTER

FIELD OF THE INVENTION

The present invention relates to a hydrokinetic torque converter and more particularly to a torque converter having at least one opening in a separating wall between the turbine hub and the associated casing cover of the converter housing.

BACKGROUND OF THE INVENTION

From DE 43 20 288, for example, a torque converter is known, in which fresh oil can be supplied to the converter torus, e.g., to the impeller, via a supply line. The heated oil can be removed, for example, in the area of the casing cover, which has openings in the form of radial channels, through which a flow connection can be established between the converter torus and a withdrawal line. The channels are created by providing the converter cover, on its side facing the turbine hub, with projections located at predetermineable distances to one another in the circumferential direction. These projections serve as contact points for a disk; the disk interacts with the casing cover and forms, when secured to the projections, a channel between each respective pair of projections.

To form such channels, the torque converter of DE 43 20 288 requires two components, i.e., the casing cover and the disk. For this reason, manufacturing the openings entails relatively high technical production costs, especially when the two components are connected to one another by welding and heat-related distortion must thus be expected. Because of this, it is possible for leakage to result in an otherwise pressure-tight arrangement of the disk relative to the turbine hub, which can be corrected only by expensive reworking.

Japanese laid-open publication 2-245 562 discloses a torque converter including a pressure fluid passage for activating the piston of a bridge coupling or lock-up clutch. It fails to disclose the unitary construction of a casing cover and a relatively thin separating wall which at the same time serves to prevent the axial movement of the turbine hub on one side of the passage. The reference also fails to disclose any means for centering the converter hub on the casing cover which permits the assembly thereof without centering tools.

German laid-open publication DE-OS 41 17 151 A1 discloses a torque converter having a flow passage for cooling the converter fluid from the outside of the casing cover into a conduit in the output shaft. A flow passage between the converter hub a part of the casing cover serving simultaneously as axial support for the turbine hub is not disclosed.

SUMMARY OF THE INVENTION

It is an object of the present invention to design the area of a flow connection between the converter circuit and an associated line in such a way that heat-related distortion phenomena can at least be reduced, with the lowest possible structural and manufacturing expense.

This object is attained according to the present invention by providing a hydrokinetic toque converter comprising a impeller driven by a primary mover, such as, for example, an internal combustion engine, a turbine coupled to an output shaft, and a stator which is blockable in one rotational direction. The impeller, the turbine and the stator together form a converter circuit filled with converter fluid such as oil. The converter fluid is fed to the circuit from a supply container through a hydraulic supply system including supply and withdrawal lines, i.e., an inlet line and a converter fluid outlet line together forming a converter fluid passage. At least one of the converter fluid inlet line and converter fluid outlet line is in flow connection with at least one opening that is provided in a separating wall extending between the turbine hub and the associated casing cover of the converter housing at an area in which the converter hub is attached to the casing cover. The separating wall with its at least one opening therein forms a flow connection between a chamber at least partially defined by the casing cover and the turbine and a second chamber at least partially defined by the converter hub and the separating wall and which is connected to the converter fluid passage. The separating wall is formed as a unitary part of the casing cover and includes a substantially radially extending portion in the area of the turbine hub serving as an axial support for and to limit the axial movement of the turbine hub. In addition, the separating wall, in the area where it connects with the casing cover is provided with a centrally located annular recess for providing a seat to attach the converter hub to the casing cover without the necessity of a centering tool. Because the separating wall is formed as a single piece with the casing cover, it is possible to do without additional components, such as the disk used in the prior art, so that no welding is necessary in the extension area of the separating wall of the casing cover and thus no distortion of the separating wall can occur. This means that when the turbine hub or an adjacent component facing the casing cover comes to rest on the separating wall, the oil which leaves the converter circuit due to the overpressure prevailing there is unlikely to follow a course other than that through the opening. In addition, the solution according to the invention assigns a second function to the casing cover; namely, the casing cover acts as an axial support to brace the turbine hub against axial movements. Such axial movements frequently occur in converters, for example, when the blades of the impeller and of the turbine expand due to the flow load during rotation, with one of the expanding components being oriented in the axial direction. The casing cover of the converter, with its separating wall acting as an axial support, counteracts any axial movement of the turbine hub that results from such expansion of the impeller or turbine.

The area of the separating wall that acts as the axial support preferably has a planar surface, against which the turbine hub or a component, such as, for example, an axial bearing arranged between the latter and the separating wall can bear with sufficient impermeability, especially when, due to the aforementioned expansion of the turbine wheel, this contact occurs under an axial force that carries out a sealing function.

A central recess is provided in the casing cover so that the converter hub can be placed into the casing cover without the use of centering tools, because the function that would otherwise be carried out by such tools is performed by the provided central recess.

The present invention is also directed to an advantageous process for producing the separating wall during a deformation process performed on the casing cover without additional manufacturing expense. It is particularly advantageous when the aforementioned central recess is also produced in the course of this deformation process. The procedure used preferably allows the central recess to be formed in the separating wall by means of a ring-shaped projection on the tool carrying out the deformation process.

When the deformation process on the casing cover is carried out accurately, it is possible, since there is no welding process involved and therefore no thermal distortion, for the planar surface of the separating wall produced during the deformation process to be used without subsequent reworking for its function, namely, to form an axial support for the adjacent component arranged on the turbine-side, e.g., the axial bearing or turbine hub.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

The invention is described in greater detail below with reference to the drawings in which:

FIG. 2 is a cross-sectional view of a drawing tool for a casing cover of the torque converter of the present invention.

DETAILED DESCRIPTION OF THE PRESENTLY PREFERRED EMBODIMENTS

Figure 1A:
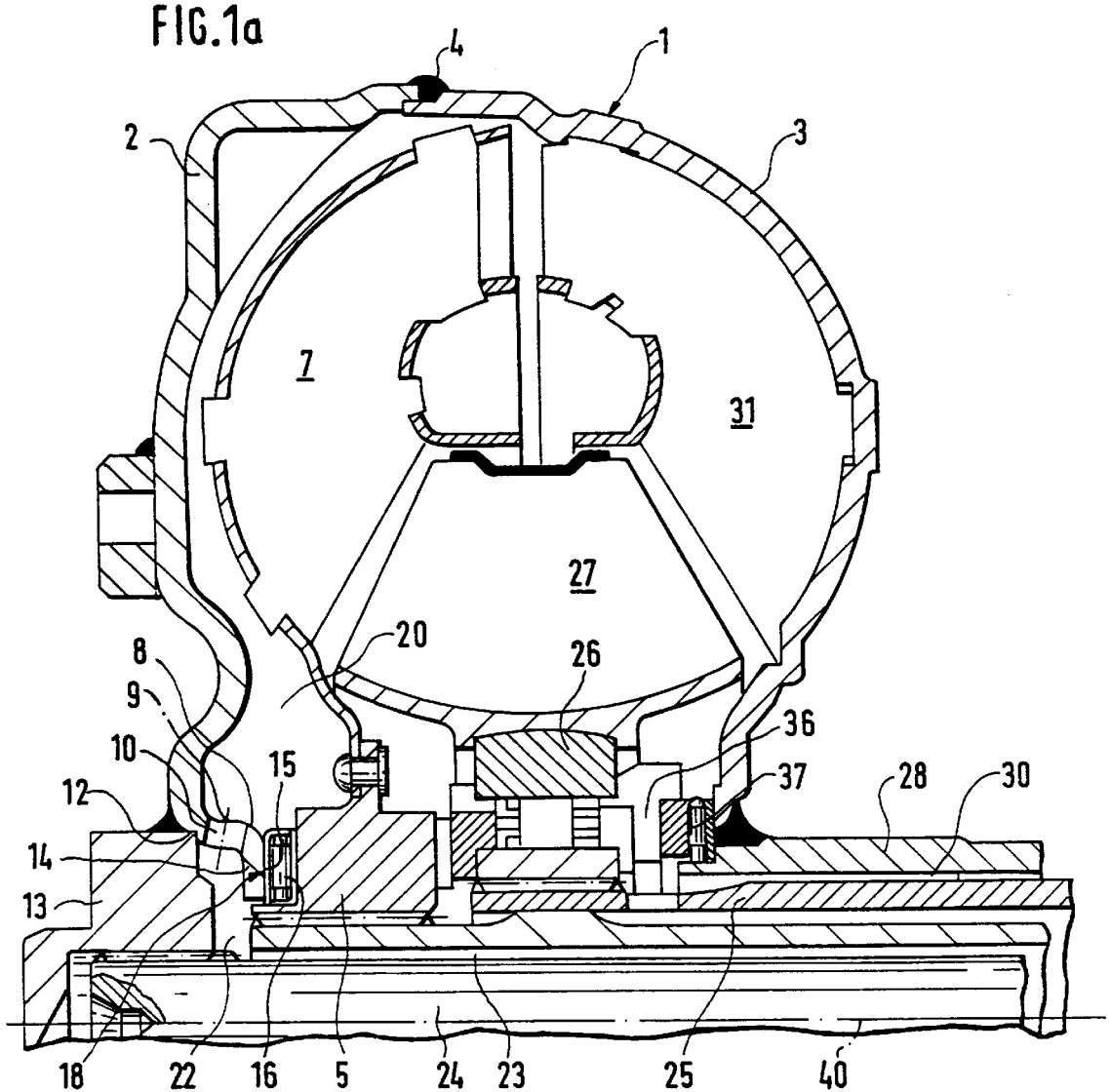
FIG. 1a is a longitudinal cross-sectional view of the upper half of a hydrokinetic torque converter of the present invention.

FIG. 1a shows a hydrokinetic torque converter including a converter housing 1 formed by two casing covers 2, 3 placed together in the axial direction and connected to one another by means of an encircling welded seam 4. The casing cover 2 on the drive side, i.e., the casing cover that faces toward a prime mover, e.g., an internal combustion engine, has in its radially inner area a separating wall 8 that extends in the direction of the turbine hub 5 of a turbine 7. The function of the separating wall 8 is described in greater detail below. The separating wall 8 has a section 9 that runs substantially axially and on which, in the circumferential direction, there are provided openings 10 at regular distances to one another. In the adjacent area, on the side facing away from the turbine hub 5, there is also a central recess 12 on the section 9. The central recess 12 permits the centering of the converter hub 13, which is connected to the casing cover 2 by welding in the circumferential area of the central recess 12.

Bordering the axial section 9 of the separating wall 8 on its end facing the turbine hub 5, there is a substantially radial section 14, which has, on its side facing the turbine hub 5, a planar surface 15 for accommodating an axial bearing 16. On the side of the axial bearing 16 that faces away from the planar surface 15, the turbine hub 5 comes to rest. The radial section 14 with its planar surface 15 on the separating wall 8 of the casing cover 2 acts as an axial support 18 for the turbine hub 5, in order to secure the latter against the greater axial movements that occur during rotation of the converter housing 1 due to the expansion of, especially, the turbine 7, with one component in the radial direction and one component in the axial direction under the effect of converter fluid forced radially outward by centrifugal force.

Figure 1B:
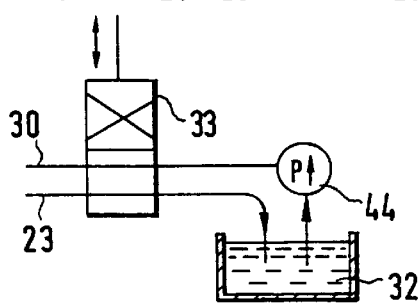
FIG. 1b is a schematic view of a pressure fluid supply system for use in the present invention.

By means of the separating wall 8 of the casing cover 2, a chamber 20, which is limited on one side by the turbine 7 and on the other by the casing cover 2, is separated from a space 22, which extends radially inside the axial section 9 of the separating wall 8, between the converter hub 13 and the radial section 14 of the separating wall 8. During the substantially pressure-tight support of the axial bearing 16 on the turbine hub 5, on the one hand, and on the planar surface 15 of the radial section 14 of the separating wall 8, on the other, the converter fluid, e.g., oil, flows through the openings 10; the flow direction of the oil depends on whether the pressure is higher in the chamber 20 or in the space 22. Axially bordering the space 22, a line or passage 23 ends, which is located radially between an output shaft 24 of the torque converter and a sleeve shaft 25, which surrounds the output shaft at a distance, in the form of a ring-channel. In a manner known per se and described, for example, in DE 41 21 586 A1, the entire content of which is hereby incorporated by reference, the sleeve shaft 25, via a freewheel mechanism 26, carries the stator 27 of the torque converter, which is arranged between the turbine hub 5 and the output-side casing cover 3 in a manner so as to be secured against axial movement. In turn, the casing cover 3 is fixedly connected in its radially inner area to a hollow shaft 28, for example, by means of a welded seam; the tube 28 surrounds the sleeve 25 in order to form a further passage 30 at a radial distance, so that a further ring-shaped channel is created. The hollow shaft 28 is mounted in a gear mechanism (not shown), where it drives a pump 44, in order to supply the torque converter with oil from a supply container 32 as shown in FIG. 1b. During operation of the torque converter, the oil is preferably supplied via the passage 30 to the impeller 31 associated with the casing cover 3, especially in order to perform a cooling function in the converter circuit, which consists of the impeller 31, the turbine 7 and the stator 27. Under pressure the oil is pressed from the chamber 20 through the openings 10 into the space 22, and leaves the torque converter via the line 23 into the supply container 32. The supply container 32 is connected via a valve 33 to both the line 23 and the passage 30; depending on the setting of the valve 33, the line 23 or the passage 30 is used as the supply or extraction line. In the following functional description of the torque converter, the valve 33 is set in such a way that the passage 30 serves as the supply line and the line 23 serves as the withdrawal or return line.

Under this setting of the valve 33, fresh oil is transported by the pump 44 from the supply container 32 into the passage 30 and moves radially outward into the impeller 31 through passages 36, which are located axially between an axial bearing 37 associated with the casing cover 3 and the freewheel mechanism 26. When the converter housing 1 and thus the impeller 31 is driven by the internal combustion engine, the turbine 7 is set into rotation, as is, via the turbine hub 5, the output shaft 24, the movement of which is transmitted to the gear mechanism (not shown). The flow leaving the turbine 7 is directed against the impeller 31 via the stator 27. In the converter circuit and thus in the attached chamber 20, the supply of pressurized oil generates an overpressure relative to the space 22 and thus to the return line 23. As a result, a quantity of oil that corresponds roughly to the quantity of oil supplied through the passage 30 makes its way radially inward through the openings 10 in the separating wall 8 into the space 22 and from there into the return line 23, from where the oil is fed back into the supply container 32. At the same time, because the oil in the converter circuit is pushed radially outward by the rotational movement of the latter, there is deformation of, especially, the very thin outer wall of the turbine 7; specifically, the deformation is such that the turbine 7 expands slightly in both the radial and axial directions. The axial expansion of the outer wall of the turbine 7 results in an axial movement of the turbine hub 5 in the direction of the radial section 14 of the separating wall 8. As a result, the turbine hub 5, with its side facing the separating wall 8, presses the axial bearing 16 against the planar surface 15 of the separating wall 8. Due to the increased surface pressure between the individual components 8 and 16, on the one hand, and the components 16 and 5, on the other, the portion of oil that leaks through at this point is negligible.

As FIG. 2 shows, the pressure punch 42 of a tool is placed onto the casing cover 2, starting from the side of the casing cover 2 that faces an internal combustion engine when installed. The casing cover 2 still has a flat surface, at least in the radial extension area of the separating wall 8, but has already been provided with the openings 10. At the point at which the separating wall 8 is to be formed, the pressure punch 42 has a disk-shaped projection 45. At the point at which the central recess 12 is to be formed, the pressure punch 42 has a ring-shaped protrusion 46. For the production process, the pressure punch 42 is placed in the radially inner area of the casing cover 2, i.e., in the area radially surrounding the central axis 40; then, as a force acts in the direction of a tool counterholder 43 holding the casing cover 2, the pressure punch 42 presses the casing cover 2 into a pressing recess 48 that establishes at least the form of the separating wall 8. During this movement, the separating wall 8 is pulled with its axial and radial sections via the projection 45 on the pressure punch 42, and the central recess 12 is formed by means of the ring-shaped protrusion 46 on the pressure punch 42. In this way, the separating wall 8 can be formed on the casing cover 2 and the central recess 12 can be established in a single process step. After the casing cover 2 is formed in this manner, and after the pressure punch 42 is removed from the counterholder 43 and the casing cover 2 is removed from the pressure recess 48, the converter hub 13 is put in place; specifically, with its circumferential area accurately positioned relative to the central recess 12, so that additional centering tools for centering the converter hub 13 relative to the casing cover 2 are unnecessary. The converter hub 13 is then secured in place on the casing cover 2 by welding at its circumferential area. Finally, the casing cover 2 manufactured in this way can be connected to the casing cover 3 by means of an axial movement and secured thereto by the welded seam 4.

When producing the separating wall 8 on the casing cover 2, it is possible to form the separating wall 8 in such a way that on its radial section 14, on the side facing the turbine hub 5, a planar surface 15 is created for support of the axial bearing 16. Because no welding is carried out in the area immediately around the planar surface 15, no heat-induced distortion can occur. The welded seam generated by the attachment of the hub 13 to the casing cover 2 will not cause any direct distortions because the space 22 acts as an insulator between this welded seam and the radial section 14 and, radially outside the space 22, the openings 10 also act as insulators. Heat transfer from the aforementioned welded seam to the radial section 14 can thus occur only via the axial section 9 of the separating wall 8 between two of the respective openings 10. The portion of the heat created during welding that reaches the radial section 14 is so small that there is no thermally-induced distortion of the radial section 14 and thus of the planar surface 15. As a result, it is possible to dispense with expensive and labor-intensive reworking of the planar surface 15.

The present invention is not limited by the embodiments described above which are presented as examples only but can be modified in various ways within the scope of protection defined by the appended patent claims.

What is claimed is:

1. A process for configuring a casing cover for a hydrokinetic torque converter having a turbine and an axis about which the torque converter operatively rotates, said method comprising:

forming a casing cover having openings therein;

deforming the formed casing cover in a substantially axial direction to form a separating wall including said openings for extension between a turbine hub and a converter hub, said separating wall separating a first chamber at least partially defined by the casing cover and the turbine and a second chamber at least partially defined by the turbine hub and the converter hub, the openings in the separating wall defining a flow passage for converter fluid from the first chamber to the second chamber, and deforming the casing cover in a substantially radial direction so that when said casing cover is in place said separating wall laterally supports and prevents axial movement of the turbine hub;

in the same deformation step forming a centered annular recess in the outside of the casing cover so that when the converter hub is attached to the casing cover the annular recess receives and centers the converter hub relative to the axis of the torque converter.

2. The process of claim 1, wherein the deforming step is performed by drawing the separating wall under pressure relative to the casing cover.

3. The process of claim 2, wherein the annular recess is produced in predetermined timely sequence with said deformation step.

* * * * *